L. F. DOUGLASS.
HOLDER FOR TALKING MACHINE RECORDS.
APPLICATION FILED JUNE 5, 1909.

1,032,385.

Patented July 16, 1912.
3 SHEETS—SHEET 1.

WITNESSES
F. J. Hartman.
A. J. Gardner.

INVENTOR
Leon F. Douglass.
BY
ATTORNEY

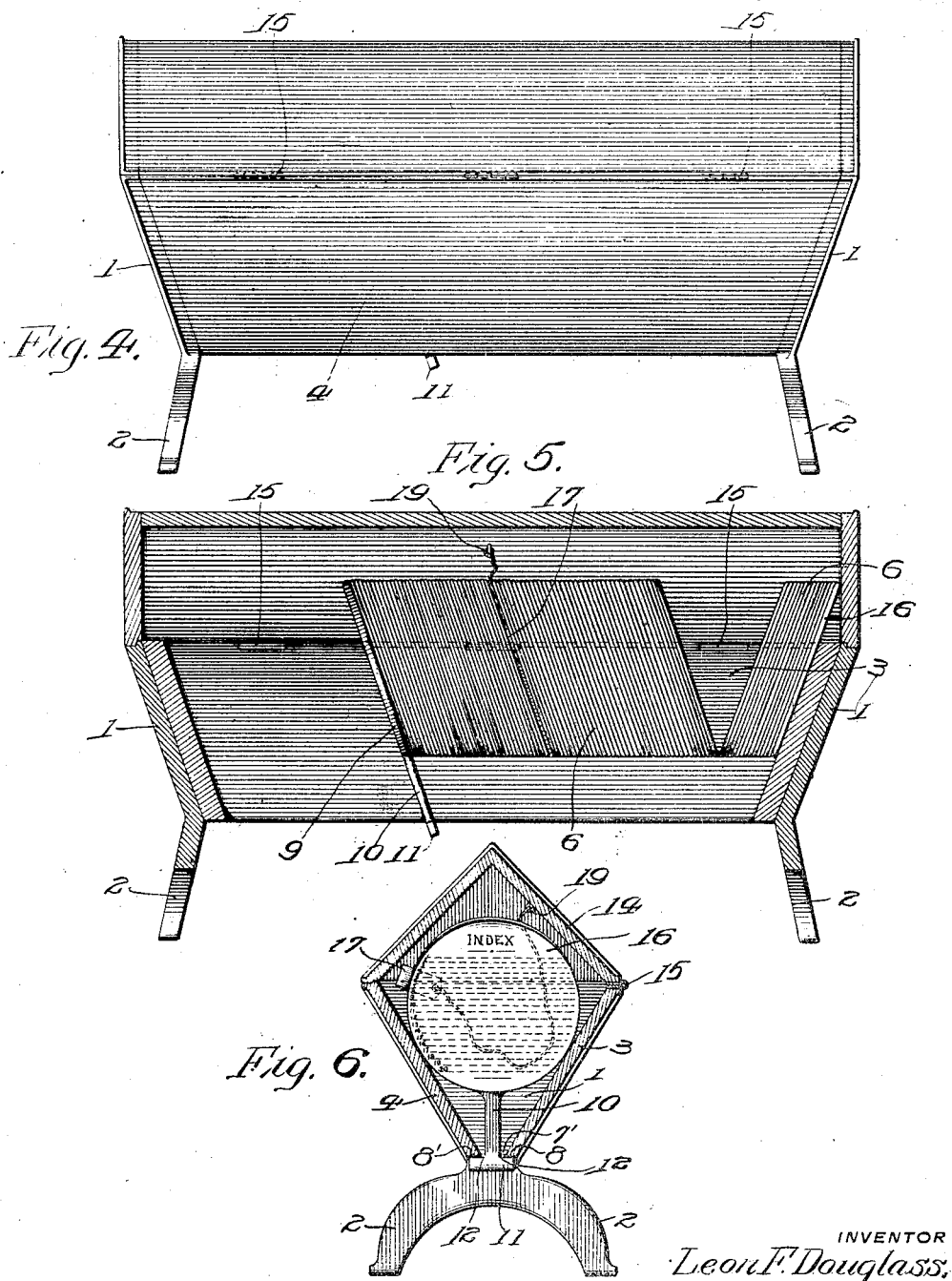

L. F. DOUGLASS.
HOLDER FOR TALKING MACHINE RECORDS.
APPLICATION FILED JUNE 5, 1909.
1,032,385.
Patented July 16, 1912.
3 SHEETS—SHEET 3.
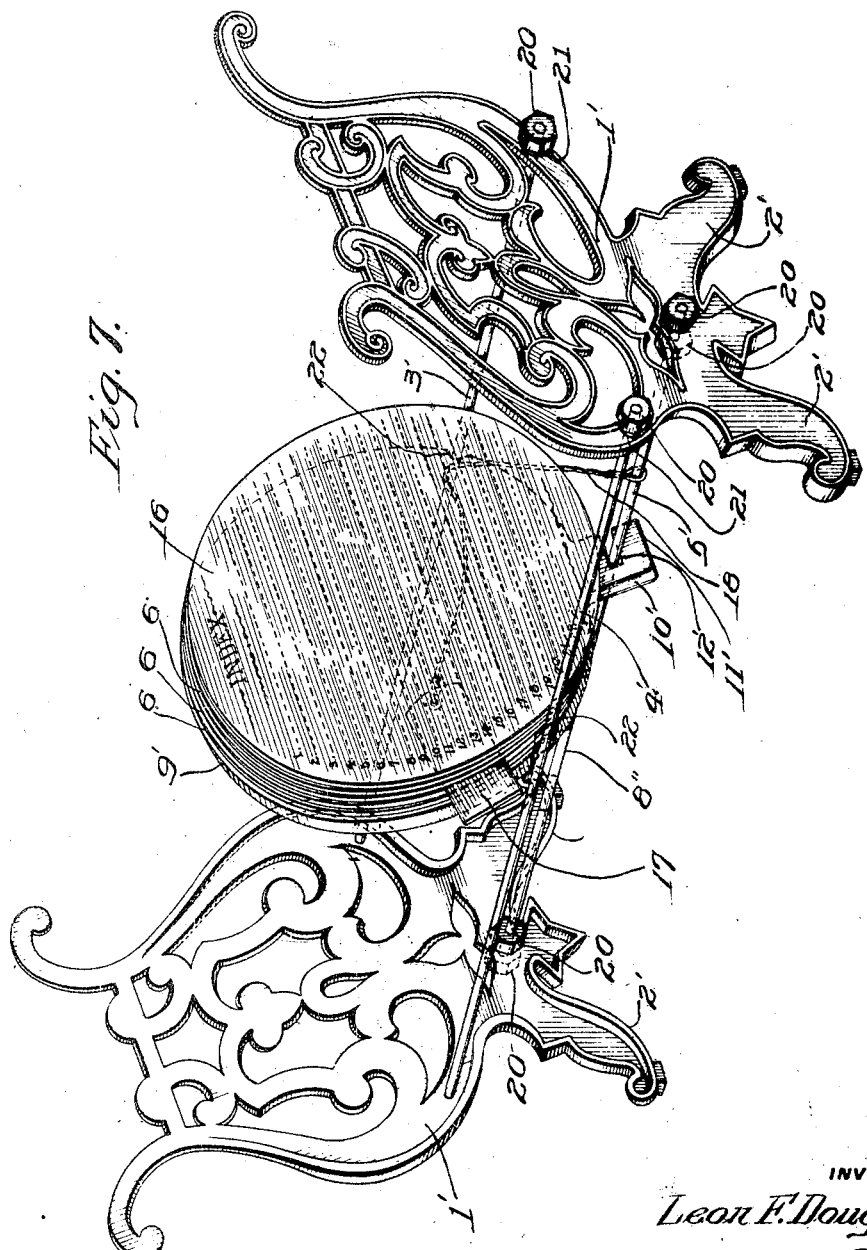
WITNESSES
INVENTOR
Leon F. Douglass.
BY
ATTORNEY

UNITED STATES PATENT OFFICE.

LEON F. DOUGLASS, OF SAN RAFAEL, CALIFORNIA, ASSIGNOR TO VICTOR TALKING MACHINE COMPANY, A CORPORATION OF NEW JERSEY.

HOLDER FOR TALKING-MACHINE RECORDS.

1,032,385.   Specification of Letters Patent.   Patented July 16, 1912.

Application filed June 5, 1909. Serial No. 500,357.

*To all whom it may concern:*

Be it known that I, LEON F. DOUGLASS, a citizen of the United States, and a resident of San Rafael, county of Marin, and State of California, have invented certain new and useful Improvements in Holders for Talking-Machine Records, of which the following is a specification.

The objects of this invention are to provide a simple, strong and durable holder of artistic design for records for talking machines, particularly those records of the disk type, which holder will be easy to manipulate, that will protect the records from injury and that will hold the records so that they may be conveniently removed or replaced without danger of injuring the same; to provide a holder having an improved marker; to provide a holder having a convenient index card; to provide a holder which may be constructed to completely inclose the records and to provide other improvements as will appear hereinafter.

Figure 1:
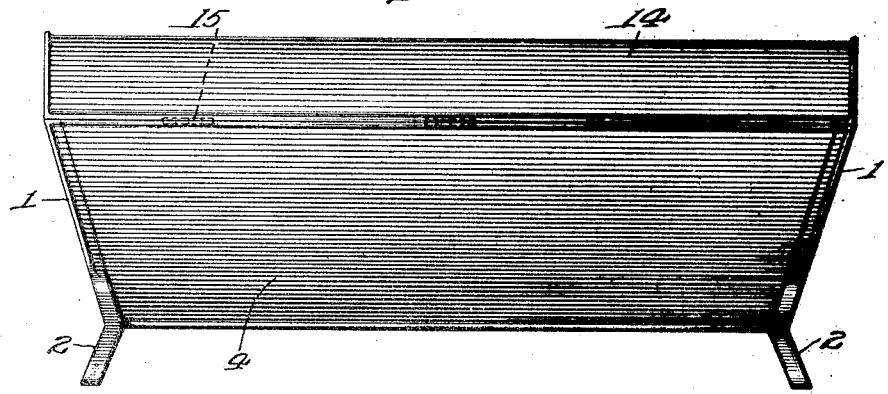
Figure 2:
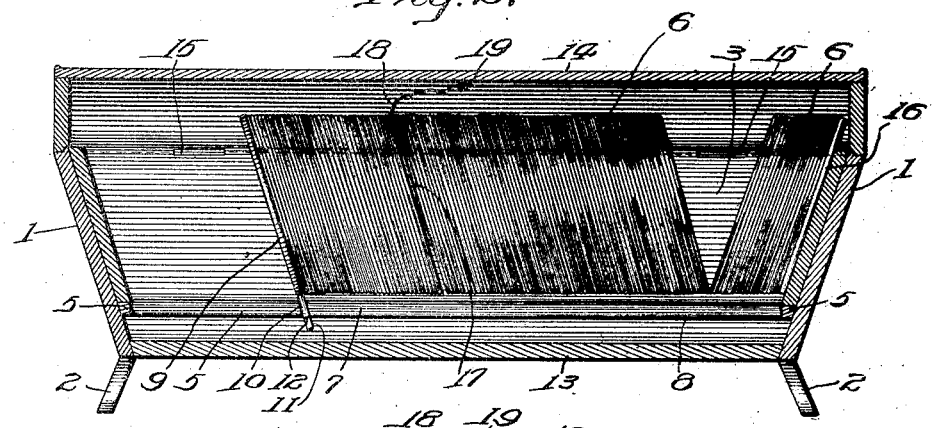

In the accompanying drawings forming a part of this specification in which the same reference characters are used throughout the various views to designate the same parts, Figure 1 is a side elevational view; Fig. 2 a longitudinal sectional view and Fig. 3 a transverse sectional view of one form or embodiment of my invention; Figs. 4, 5 and 6 are similar side elevational, longitudinal sectional and transverse sectional views of a modified form of my device, and Fig. 7 is a perspective view of a further modification of my invention.

Figure 3:
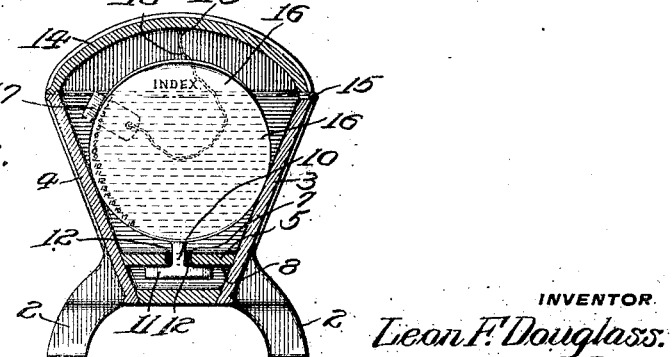

Referring first to the form of device illustrated in Figs. 1, 2 and 3 the holder for records may consist of a frame or casing having two oppositely arranged end walls or members 1, each of which is provided with a pair of legs 2, upon which the holder is supported. The end walls or members 1 preferably diverge upwardly, as plainly shown in Figs. 1 and 2. The said end walls or members are connected together by a number of substantially horizontal members 3, 4 and 5, all of which preferably extend in a parallel direction of which 3 and 4 form a parallel direction of which 3 and 4 form upwardly diverging side walls and 5 forms a bottom wall. The side walls are preferably arranged at such an angle to each other that when the talking machine record 6 is placed therein and supported at its edge the said walls 4 and 5 prevent the record from touching the bottom wall 5, the record being supported by an edge engaging with the diverging side walls 3 and 4. The bottom wall 5 may be provided with a slot 7 extending substantially the full length of the bottom wall longitudinally of the holder, and the bottom edges of the wall adjacent the slot will form shoulders 8 for the purpose which will appear below. To permit the use of the holder with a fewer number of records than that which would be required to completely fill the holder, I provide a movable end wall or keeper, or follower 9 which I have shown in Figs. 2 and 3 as comprising a disk having a substantially regular projection 10 terminating in a head 11 forming one or more shoulders 12 to coöperate with the shoulders 8 of the bottom wall or member 5. The disk of the movable end wall or keeper 9 is preferably of substantially the same diameter as the diameter of the disk records to be stored in said holder and the proportions of the said disk and the projection 10 and the head 11 are such that when the edges of the disk of the movable end wall or keeper 9 are arranged transverse to the holder with its peripheral edge resting on the side walls 3 and 4 and when held in a perpendicular position with respect to the holder proper the shoulder 12 on the head 11 will be spaced by a short distance from the shoulder 8 to the bottom wall 5. When, however, the said disk is rocked or turned or inclined at a suitable angle from its perpendicular position the said shoulders 12 and 8 will engage and by their friction will oppose the force applied to move the keeper longitudinal to the holder. It will be plain that the more force there be applied tending to turn the keeper or movable end wall 9, the greater will be the clamping action between the shoulders 12 and 8. If, however, it is desired to move the keeper to a different position longitudinally of the record holder, it is merely necessary to bring it toward a perpendicular position and then to bodily slide it along to the desired position. In Figs. 1, 2 and 3 I have shown the head 11 as being substantially T-shaped and engaging shoulders on either side of the slot 7. I may inclose the bottom of the holder by a closure 13 and a cover 14 may be arranged at the top of the holder to completely inclose the records contained therein and to protect them from injury or accumulations of dust. I have shown the cover 14 as being hinged at 15 to the side wall 3.

The movable end wall or keeper 9 may be provided with an index card or tablet 16 with suitable numbered spaces for the insertion of a list of records in the holder, the records being preferably arranged to correspond to the numerals on the index. I also prefer to provide the holder with a marker which is shown in Figs. 2 and 3 to consist of a card 17 provided with or without printed instructions for its use thereof, which card 17 may be provided with a cord 18 of sufficient length to permit its being passed between any two records when the holder is filled with records. One end of the cord 18 should be attached to the casing or cover, as to an eyelet 19 in the cover 14. The movable end wall or keeper 9 should be so made that when it is in its clamped position it will be substantially parallel the permanent fixed end wall 1.

By this construction any number of the disk records 6 within the capacity of the holder may be supported upon the two side walls 3 and 4 of the holder between one permanent fixed end wall 1 and a movable end wall or keeper 9 and may be held compactly together inclined parallel to the inclined surface of a fixed end 1 by inclining the keeper parallel thereto, or the keeper may be inclined in the opposite direction as shown in Fig. 2 of the drawings and the records may be held in any convenient position between the keeper and the end of the holder. When the keeper is in the inclined position shown in Fig. 2 it is clamped and practically held in place by the engagement of the shoulders 8 and 12 above described, and the weight of the records resting against the keeper acts to firmly hold the keeper in position. The keeper may be readily unclamped however for moving it in either direction longitudinally of the holder by swinging it toward a vertical position. When it is desired to fill the entire space between the permanent and rigid end walls 1 of the frame with records, the partition or keeper may be removed, but when only a portion of the rack is filled with records the keeper will serve a needful function in holding the records in proper position. The cord 18 attached to the marker 17 serves to enable one to put a record which has been removed from the holder back into its proper place with facility. When a record is removed from the frame the marker may be moved into the space left vacant by the withdrawal of the record to indicated the proper position for the return of the record to facilitate the keeping of the records in orderly arrangement. When the marker is thus in operative position the records may be swung to an angle parallel with either the fixed end wall or parallel to the movable end wall to locate a second record without losing the place thus kept by the marker 17.

In Figs. 4, 5 and 6 I have shown a slight modification of the structure above described in which instead of completely inclosing the bottom of the holder as by the bottom closure 13 shown in Figs. 2 and 3, the bottom is left open and the slot 7' is formed between the ends of the upwardly diverging side walls 3 and 4, providing the shoulders 8' for coöperation with the shoulders 12 on the head 11. I have shown the cover as slightly different from that shown in Fig. 1, although its purpose and operation are like that of the modification first described.

In Fig. 7 I have shown a still further modification of my invention in which the end walls 1' may be made of cast metal in the form of scrolls or any other artistic form, provided with legs 2' and in which rods 3'—4' constitute the side walls of the holder. A third rod 5' constitutes the bottom wall or member, the under half of which 8'' forms the surface or shoulder which coöperates with the shoulder 12' of the radial projection 10' of the movable wall or keeper 9', by means of the engagement of which shoulders 12' and 8'' the keeper or movable wall 9' is held clamped rigidly when the movable wall or keeper 9' is inclined from the vertical position. The keeper 9' and the records 6 peripherally engage and rest upon the longitudinal rods or wall 3'—4', as in the modifications above described. The rods 3'—4' and 5' may be secured to the end walls or plates 1' by means of bolts 20, engaging suitable lugs or spots 21 on the sides of the end walls 1'. The movable end wall or keeper 9' may be provided with notches 22 at the points where its periphery engages the rods 3'—4', for the purpose of causing the keeper to rest firmly on said rods when swung into its clamped position. The marker 17, as in the previously described modifications is provided with a cord 18 which may be secured to any convenient part of the holder, as for instance to the bottom rod 5' so as to slide thereon and enable the marker to be carried from one end of the holder to the other to insert it between any two records to indicate that a record between the said two records has been removed. The index plate of the index may consist of a circular disk of cardboard or any other suitable material and may be supported loosely upon the rods 3'—4' in any convenient position, the index tablet being provided with numbered spaces to permit of the insertion of a list of records in the holder and the orderly arrangement of the records in the holder. In this form of my device the records are not inclosed or protected, as in the other two forms of my invention previously described, but the manner of holding the records and the adjustability of the adjustable wall or keeper is substantially the same in all the modifications.

It will be observed that by reason of the constructions previously described as embodying my invention, I have provided a simple, inexpensive and convenient holder for talking machine records in which the said records are supported upon their edges at two points in a manner to afford ready access to and removal of the same, and in which the records are held closely together at their bottom edges so as to be always supported on their edges whether the holder be partially filled or completely filled with records, the same affording an expansible means for holding talking machine records, that is to say a construction which adapts itself to a few or many records holding them always in the same accessible manner and in all the modifications the movable wall, or keeper, or follower and the fixed end wall coöperating therewith afford a means for limiting the inclination of records in opposite directions.

Having thus described my invention what I claim and desire to protect by Letters Patent of the United States is:

1. A holder for disk talking machine records, comprising plane side and end walls converging downwardly, a follower between said side walls, a bottom extending between said walls and having a longitudinal slot therein, and an extension from said follower engaging with said slot and coöperating with said side walls, to support and maintain said follower at a given angle.

2. A holder for disk talking machine records, comprising downwardly converging plane side walls, a follower readily removable and wholly supported by said side walls, and means coöperating with said walls to support and maintain said follower at a given angle.

In witness whereof, I have hereunto set my hand this 28 day of May A. D. 1909.

LEON F. DOUGLASS.

Witnesses:
WILLIAM J. BOYD,
JAMES B. DAVIDSON.